United States Patent [19]

Osanai et al.

[11] Patent Number: 5,991,433
[45] Date of Patent: Nov. 23, 1999

[54] METHOD FOR ANALYZING SKIN SURFACE AND APPARATUS THEREFOR

[75] Inventors: Osamu Osanai; Yukihiro Yada; Shuichi Akazaki, all of Tokyo, Japan

[73] Assignee: KAO Corporation, Tokyo, Japan

[21] Appl. No.: 08/848,732

[22] Filed: May 22, 1997

[30] Foreign Application Priority Data

May 23, 1996 [JP] Japan .................................. 8-153219

[51] Int. Cl.[6] .................................................. G06K 9/00
[52] U.S. Cl. .......................................... 382/133; 600/476
[58] Field of Search .................................. 382/133, 156, 382/157, 158, 278; 600/476, 477, 306; 602/54

[56] References Cited

U.S. PATENT DOCUMENTS

| 5,683,710 | 11/1997 | Akemi et al. | 424/448 |
| 5,696,838 | 12/1997 | Chiu et al. | 382/209 |

FOREIGN PATENT DOCUMENTS

| 0312736 | 4/1989 | European Pat. Off. | G01B 5/10 |
| 1053165 | 3/1989 | Japan | G01N 33/50 |
| 5-329163 | 12/1993 | Japan | G01N 21/35 |
| 7055707 | 3/1995 | Japan | G01N 21/59 |

OTHER PUBLICATIONS

Tsutomu Shino, Journal of Society of Cosmetic Science, vol. 2, No. 1, pp. 13–18, "A Newly Devised Skin Strip Method for the Safety Evaluation of Cosmetics", 1978, (with partial English translation).

Journal of Japanese Society of Dermatology, vol. 99, No. 9, pp. 999–1006, Aug. 1989, (with partial English translation).

Kenneth J. McGinley, et al., Journal of Investigative Dermatology, vol. 53, No. 2, pp. 107–112, "A Method for Visualizing and Quantitating the Desquamating Portion of the Human Stratum Corneum", 1969.

Nakayama et al. "Studies on various factors affecting the efficacies of skin care profucts by instrumental skin measurment and consumer preference testing" Journal of Soc. Cosmet Chem Japan, 1986 v20, No. 2, pp. 111–120.

Schatz et al. Quantification of dry (xerotic) skin by image analysis of scales removed by adhesive discs (D–squames) J. Soc. Cosmet. Chem. v44, pp. 53–63, Feb. 1993.

*Primary Examiner*—Amelia Au
*Assistant Examiner*—Jingge Wu
*Attorney, Agent, or Firm*—Oblon, Spivak, McClelland, Maier & Neustadt, P.C.

[57] ABSTRACT

A method and apparatus for analyzing skin surface conditions which includes transferring horny cells from a skin surface of a subject onto an adhesive face of a base sheet. In addition, a learning-type image measurement system equipped with autocorrelation mask patterns is executed on a morphology of the horny cells in the image, thus judging at least one of a degree of overlapping, a degree of ellipticity and a degree of area of the horny cells. Further, the skin surface conditions are analyzed using this information.

10 Claims, 5 Drawing Sheets

METHOD FOR ANALYZING SKIN SURFACE AND APPARATUS THEREFOR

FIELD OF THE INVENTION

This invention relates to a method by which the skin surface conditions can be quickly and accurately analyzed with the use of horny cells (i.e., stratum corneum) and an apparatus for analyzing skin surface to be used therefor.

BACKGROUND OF THE INVENTION

To examine skin surface conditions, there have been known methods for analyzing horny cells. For example, McGinley reports a method therefor which comprises pressing a chamber onto the skin, dispersing horny cells in an aqueous solution of a nonionic surfactant, collecting the horny cells thus dispersed by centrifuging and then analyzing the conditions of the horny cells [Journal of Investigative Dermatology, Vol. 53, p. 107 (1969)].

Another method therefor comprises pressing the skin against the adhesive face of an adhesive tape, thus sampling horny cells onto the adhesive face, dissolving the horny cells in an organic solvent, collecting the horny cells by centrifuging, transferring the horny cells onto a slide glass and then analyzing the same. Alternatively, a slide glass coated with an adhesive is pressed onto the skin and thus the conditions of horny cells are analyzed [Shino, Journal of Society of Cosmetic Science, No. 2, 13 (1978)].

Furthermore, Kawai reports another method which comprises sampling horny cells from the skin with the use of an adhesive tape having a water-soluble adhesive, dispersing the horny cells together with the adhesive in a water-soluble solvent, filtering the dispersion through a membrane filter, transferring the horny cells, which have been optionally dispersed again, onto a slide glass, and then analyzing the conditions of the horny cells [Journal of Japanese Society of Dermatology), Vol. 99, No. 9, p. 999 (1989)].

In these methods, horny cells which have been preliminarily sampled are analyzed by dyeing followed by microscopic observation, counting a number of the cells, measuring the cell area, determining the ratio of nuclear cells, etc.

However, these conventional methods suffer from a problem that horny cells are damaged (i.e., suffering from the elimination of the constituents) due to the treatment with a solvent and thus cannot be properly analyzed. There is another problem that troublesome pretreatments including dyeing are required and thus horny cells cannot be quickly analyzed.

To overcome these problems, the present inventors have previously proposed a simplified method for counting cells which comprises pressing a transparent adhesive tape onto the skin, thus peeling off horny cells from the skin, irradiating the transparent adhesive tape having the horny cells adhering thereto with parallel beams, detecting the transmitted light, converting the transmitted light thus detected into a digital signal to thereby calculate the quantity of the transmitted light and counting the horny cells based on the relationship between the quantity of the transmitted light determined above and the cell count separately determined by the dyeing method (JP-A-7-55707; the term "JP-A" as used herein means an "unexamined published Japanese patent application"). By using this method, horny cells can be easily and quickly sampled and counted within a short period of time, thus evaluating the skin conditions.

The simplified method for counting cells disclosed in JP-A-7-55707 makes it possible to evaluate the skin conditions based on the count of the horny cells which have been peeled off from the skin and adhered to the transparent adhesive tape, namely, the skin conditions based on the peelability of the horny cells. However, it is impossible thereby to evaluate the skin conditions on the basis of the morphology, etc. of horny cells. Accordingly, the physiological conditions of the skin surface cannot be accurately evaluated by this method.

SUMMARY OF THE INVENTION

An object of the present invention is to quickly and accurately analyze the skin surface conditions with the use of horny cells to thereby solve the above-mentioned problems encountering in the prior art.

The present inventors have found out that the degree of maturation of horny cells can be judged and the skin surface conditions can be accurately analyzed, by pressing the adhesive face of a base sheet having an adhesive face to the skin surface, thus transferring horny cells from the skin surface to the adhesive face, imaging the horny cells thus transferred, and analyzing the image to thereby judge at least one of the degree of overlapping, the degree of ellipticity and the degree of area of the horny cells; and that, in the above-mentioned process, the image can be quickly and accurately analyzed by executing a learning-type image measurement system provided with autocorrelation mask patterns, thus completing the present invention.

Accordingly, the present invention provides a method for analyzing the skin surface which comprises transferring horny cells from the skin surface of a subject to the adhesive face of a base sheet having an adhesive face, imaging the horny cells thus transferred, executing a learning-type image measurement system equipped with autocorrelation mask patterns on the morphology of the horny cells in the image, thus judging at least one of the degree of overlapping, the degree of ellipticity and the degree of area of the horny cells and analyzing the skin surface conditions on the basis of the same.

As an apparatus for the practice of this method, the present invention further provides an apparatus for analyzing skin surface which comprises: a means for imaging a base sheet carrying horny cells transferred thereonto; a means for analyzing the image wherein a learning-type image measurement system provided with autocorrelation mask patterns is executed on the morphology of the imaged horny cells so as to judge at least one of the degree of overlapping, the degree of ellipticity and the degree of area of the horny cells; and a means for analyzing the skin surface conditions based on at least one of the degree of overlapping, the degree of ellipticity and the degree of area of the horny cells judged by the means for analyzing the image.

The numerical values given in these figures stand for the following meanings respectively:

1 . . . a base sheet carrying horny cells transferred thereonto;
2 . . . a means for imaging;
3 . . . an image differential filter;
4 . . . a means for analyzing image;
5 . . . a means for analyzing skin surface conditions;
6 . . . a means for measuring the quantity of transmitted light;
7 . . . an image recorder;
8 . . . Judgement of degree of overlapping, degree of ellipticity and/or degree of area with learning-type image measurement system
9 . . . Judgement of degree of maturation, judgement of peeling strength, total evaluation of skin surface condition
20 . . . a sheet for sampling horny cells;
21 . . . a base sheet;
22 . . . an adhesive face; and
23 . . . a cover sheet.

DETAILED DESCRIPTION OF THE INVENTION

Now, a mode for the embodiment of the present invention will be described in detail with reference to the accompanying drawings wherein one and the same numerical value stand for the same or equivalent members.

Figure 1:
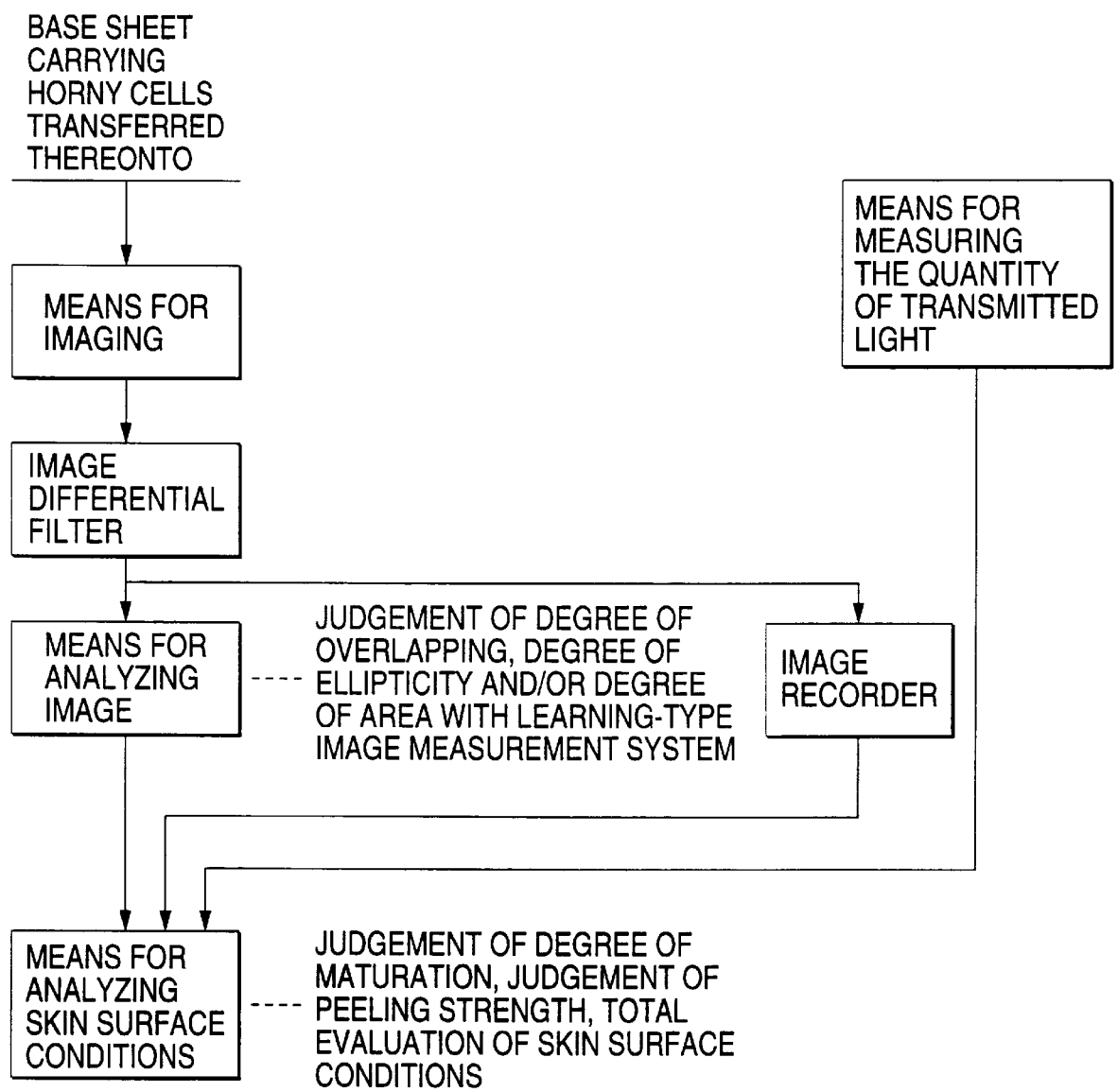
FIG. 1 is a diagram showing the whole constitution of the apparatus of the present invention.

FIG. 1 is a diagram showing a mode of the constitution of the apparatus to be used in the practice of the method of the present invention. As shown in FIG. 1, the method of the present invention in this constitution proceeds fundamentally as follows. First, a base sheet 1 carrying horny cells transferred thereonto is prepared and then imaged by a means 2 for imaging. The image thus obtained is differentiated with an image differential filter 3 to thereby increase the contrast. Next, the image is fed into an image recorder 7 so that it can be retrieved whenever required. At the same time, a learning-type image measurement system is executed by a means 4 for analyzing image to thereby judge the degree of overlapping, the degree of ellipticity, the degree of area, etc. of the cells. Based on the degree of overlapping, the degree of ellipticity and/or the degree of area thus judged, the degree of maturation of the cells is evaluated by a means 5 for analyzing skin surface conditions. On the other hand, the base sheet 1 carrying the horny cells transferred thereonto is irradiated with light in a definite dose and the quantity of the transmitted light is measured by a means 6 for measuring the transmitted light. Based on the quantity of the transmitted light thus determined, the peel strength of the cells is determined by a means 5 for analyzing skin surface conditions. By taking all of these results into consideration, the skin surface conditions are synthetically evaluated.

As the base sheet onto which horny cells are to be transferred, use can be made of one having an adhesive face similar to adhesive tapes conventionally employed in sampling horny cells. In order to protect the transferred horny cells and improve the handling characteristics of the base sheet during the subsequent steps of imaging, measuring the transmitted light, etc., it is preferable that a transparent cover sheet is adhered to the adhesive face onto which the horny cells have been transferred. It is also preferable that the base sheet per se is a transparent one.

It is particularly preferable to prepare a horny cell-sampling sheet wherein a cover sheet is integral with the base sheet, since such a sheet can quicken the sampling procedure in the analysis of horny cells of a subject or in the analysis of horny cells sampled from a number of sites. Also, it is possible to collect horny cells of an unspecified number of general public by widely distributing the horny cell-sampling sheet with the use of, for example, the mass media (newspaper advertisements, magazines, etc.), delivery systems (mailing, home delivery service, etc.) or over-the-counter distribution. Thus, the fundamental data for analyzing skin surface conditions from horny cells can be accumulated and the analytical accuracy can be elevated. Another advantage of the distribution of the horny cell-sampling sheet resides in that each subject can transfer the horny cells onto the horny cell-sampling sheet at home at any time the skin is naked and clean. Namely, it is no longer necessary that the subject goes to the counter, removes her makeup and then has the sampling of horny cells. Thus consumers of cosmetics, etc. can easily have the sampling after removing makeup by themselves at home.

Figure 2:
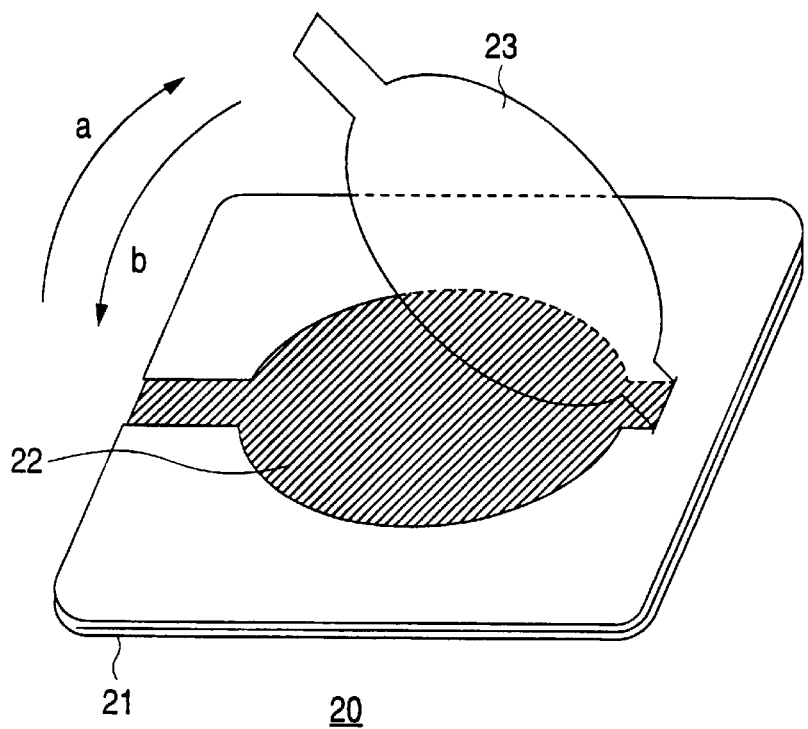
FIG. 2 is a schematic view of a sheet for sampling horny cells.

As the horny cell-sampling sheet, use can be made of the one 20 shown in FIG. 2 which is composed of a base sheet 21 made of, for example, a PET (polyethylene terephthalate) film having an adhesive face coated with a water-soluble adhesive at one face and a cover sheet 23 made of, for example, a silicone film. At the distribution to a subject, this horny cell-sampling sheet 20 is in the form of a single-layered sheet wherein the cover sheet 23 is adhered to the adhesive face 22. When the subject samples horny cells, the cover sheet 23 is peeled off from the adhesive face 22, as indicated by the arrow a, and thus the adhesive face is exposed. The horny cells of the subject can be transferred onto the adhesive face 22 by pressing the adhesive face to the skin. Subsequently, the cover sheet 23 is adhered again to the adhesive face 22 as indicated by the arrow b. Thus the horny cell-sampling sheet 20 becomes a single-layered sheet again.

It is preferable that the horny cell-sampling sheet 20 is distributed to subjects together with a questionnaire involving questions about the age, skin conditions, etc. of the subjects. The data thus obtained are highly useful in analyzing the skin surface conditions with the use of the horny cells and the skin surface conditions can be thus analyzed more accurately.

In the present invention, the horny cells transferred onto the base sheet, preferably the above-mentioned horny cell-sampling sheet, are then imaged by the means 2 for imaging as described above. In this step, the morphology of the horny cells can be directly taken by the means 2 for imaging and recorded without requiring any troublesome treatment such as dyeing the cells or pre-treating with a solvent. Accordingly, much data can be quickly and accurately processed.

As the means 2 for imaging, use can be made of, for example, an enlarging reading device (200 to 1,000× magnification) having a CCD (charge coupled device) involved therein. In this case, the questionnaire sheet may be provided with a bar code for specifying the subject which is to be read with a bar cord reader simultaneously with the imaging operation.

When the image of the horny cells is read by the means 2, the base sheet 1 carrying the horny cells transferred thereonto may be put into a mount frame which is employed for holding a film in a slide projector, thus improving the workability in the step of imaging.

Before subjecting to the subsequent image analysis, it is preferable to preliminarily process the image read with the means 2 by using an image differential filter 3. Thus the contrast of the image can be magnified and the outline of the horny cells can be made definite.

The image information processed with the image differential filter 3 is fed into to a means 4 for analyzing image as will be described hereinbelow in detail. It is preferable that the image information is also fed into an image recorder 7 and recorded in a medium such as an MO (magneto-optical disk) so that the image can be retrieved whenever required.

As the means 4 for receiving and analyzing the image which has been processed with the image differential filter 3, use is made of, in the present invention, an apparatus by which a learning-type image measurement system with the use of autocorrelation mask patterns is executed. An important characteristic of this means resides in that at least one of the degree of overlapping, which shows the degree of overlapping of the cells, the degree of ellipticity, which shows the degree of roundness or flatness of the cells, and the degree of area, which shows the cell size, is judged thereby.

Namely, at the surface layer of the skin, horny cells formed below the epidermis are flattened, pushed upward so as to form a horny layer and finally peeled off, thus repeating this cycle. When the horny cells fully mature in the course of the maturation, then individual horny cells forming the horny layer are enlarged and rounded, with little overlapping. These cells become smooth and uniform on the skin surface which reflects incident light in a definite direction at the inside of the horny layer, thus giving a transparent feel to the skin surface. In the case of the horny layer consisting of unmatured horny cells, in contrast, individual horny cells are small-sized and irregular in shape and many cells overlapping together are peeled off in the form of clusters. The surface of such a horny layer consisting of unmatured horny cells shows diffused reflection of incident light and thus the skin surface has no transparent feel.

Accordingly, the degree of maturation of horny cells can be evaluated by judging at least one of the degree of overlapping, the degree of ellipticity and the degree of area of the horny cells. In addition, the success in the maturation cycle of horny cells closely relates to various skin surface conditions such as dryness, oiliness, acne or scale, sunburn and wrinkles. Thus the skin surface conditions can be accurately analyzed and evaluated on the basis of the data of the questionnaire regarding these symptoms and the results of the judgement of the degree of overlapping, the degree of ellipticity, the degree of area or the degree of maturation of the horny cells. Moreover, it is possible to devise schemes for ameliorating the skin surface conditions based on these results.

As discussed above, it is highly important in analyzing and evaluating skin surface conditions to judge the degree of overlapping, the degree of ellipticity and/or the degree of area of horny cells or evaluate the degree of maturation based thereon. In the present invention, the degree of overlapping, the degree of ellipticity and the degree of area of horny cells are judged by analyzing the image by using a learning-type image measurement system provided with autocorrelation mask patterns as described above.

Figure 3:
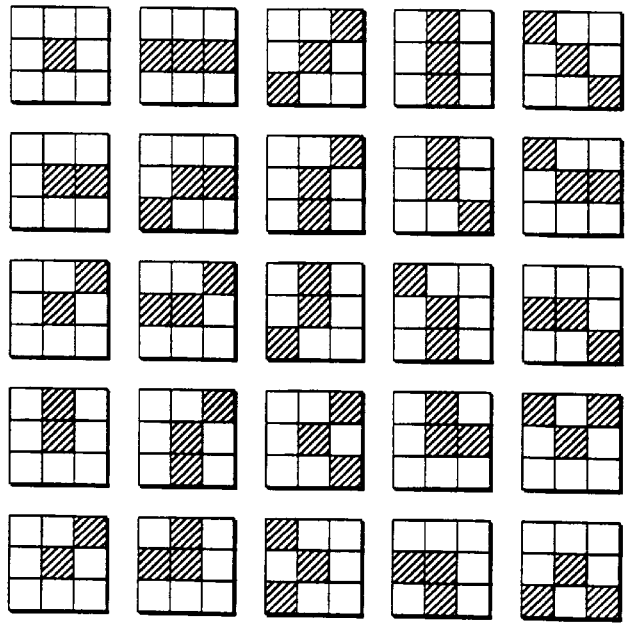
FIG. 3 is a diagram illustrating autocorrelation mask patterns.

More particularly speaking, the image of horny cells, the contrast of which has been magnified with a differential filter, is first converted into a binary image (256×256 dots). Subsequently, the autocorrelation masks are scanned per pixel [for example, 25 mask patterns each consisting of 3× 3 dots (see FIG. 3), 25 mask patterns each consisting of 5×5 dots, or 50 mask patterns putting these patterns together]. Then each of the patterns of the autocorrelation masks involved per pixel constituting the binary image are counted and referred to as the quantity characterizing the image. These characterizing quantities are ranked in 1 to 10 grades (preferably about 10 grades) which have been preliminarily determined for the degree of overlapping, the degree of flatness and the degree of area respectively. Then the relationship between the characterizing quantity and the classification grade is subjected to multivariant analysis to thereby establish a classification rule for each grade. Next, an arbitrary image of horny cells is newly judged by this system. Thus the classification grade of the horny cell image can be automatically judged by the classification rule established above.

It is preferable to analyze an image by this learning-type image measurement system, since the time required for the establishment of the classification rule can be thus shortened, as compared with other analytical methods such as the autolearning system by the back propagation algorithm of a neural network wherein learning data are successively provided and the classification rule is thus inductively established.

As an apparatus for executing the learning-type image measurement system with the use of the autocorrelation mask patterns to automatically evaluate the morphology of horny cells, use can be made of, for example, Aiss (Adaptive Intelligent Sensing System) manufactured by Oyo Keisoku Kenkyusho, K.K.

After automatically judging the degree of overlapping, the degree of flatness or the degree of area of horny cells in the present invention, the degree of maturation of the horny cells is evaluated with a means 5 for analyzing skin surface conditions on the basis of the results of the judgement. In this case, a computer may be used as the means 5 for analyzing skin surface conditions.

On the other hand, the base sheet carrying the horny cells transferred thereonto is irradiated with light in a definite dose and the quantity of light thus transmitted is determined by the means 6 for measuring the transmitted light. Thus the transmittance of the base sheet is determined. Next, this transmittance is converted into the amount of the cells which have been peeled off by the means 5 for analyzing skin surface conditions and then the peeling strength is judged therefrom.

By the means 5 for analyzing the skin surface conditions, the skin surface conditions are analyzed and evaluated synthetically on the basis of the above-mentioned degree of overlapping, the degree of ellipticity and the degree of area of the horny cells and the degree of maturation determined therefrom, the peeling strength and the data (dryness, oiliness, acne or scale, sunburn, wrinkles, etc.) obtained from the questionnaire. If needed, there may be proposed schemes for ameliorating the skin surface conditions.

The fundamental data, based on which the skin surface conditions are analyzed and evaluated by the means 5 for analyzing skin surface conditions, optionally involve the above-mentioned data obtained by analyzing the image, the data obtained by measuring the transmitted light, the data obtained from the questionnaire and any other data, for example, those obtained by dissolving horny cells in a solvent and analyzing the constituents in a conventional manner.

The means 5 for analyzing the skin surface conditions may be connected to various peripheral equipments, if necessary. For example, a monitor and a printer outputting the results of the analysis and evaluation of the skin surface conditions may be connected thereto. It is also possible to connect a video printer outputting the image of the horny cells thereto.

EXAMPLE

To further illustrate the present invention in greater detail, the following example will be given.

A water-soluble adhesive was applied onto one face of a base sheet made of a transparent PET film. Further, a silicone cover film was layered thereon to give a horny cell-sampling sheet. The adhesive face of this horny cell-sampling sheet was pressed onto cheek of subjects having a washed face and thus horny cells were transferred onto the adhesive face of the base sheet. Then the adhesive face was covered with the film and employed as a sample to be analyzed.

Next, the above-mentioned sample was imaged with a CCD camera (800× magnification) and the size of each horny cell was measured manually with the use of a marketed image analyzer. As a result, the horny cells varied in area from 700 $\mu m^2$ to 950 $\mu m^2$ and showed an average area of 830 $\mu m^2$. The degree of area (i.e., a score relating to cell size) of each horny cell contained in the image was scored in 10 grades as specified below by a skilled person.

1: considerably small.
2: intermediate size between 1 and 3.
3: small.
4: somewhat small.
5: a little smaller than the standard.
6: a little larger than the standard.
7: somewhat large.
8: large.
9: intermediate size between 8 and 10.
10: considerably large.

Figure 4:
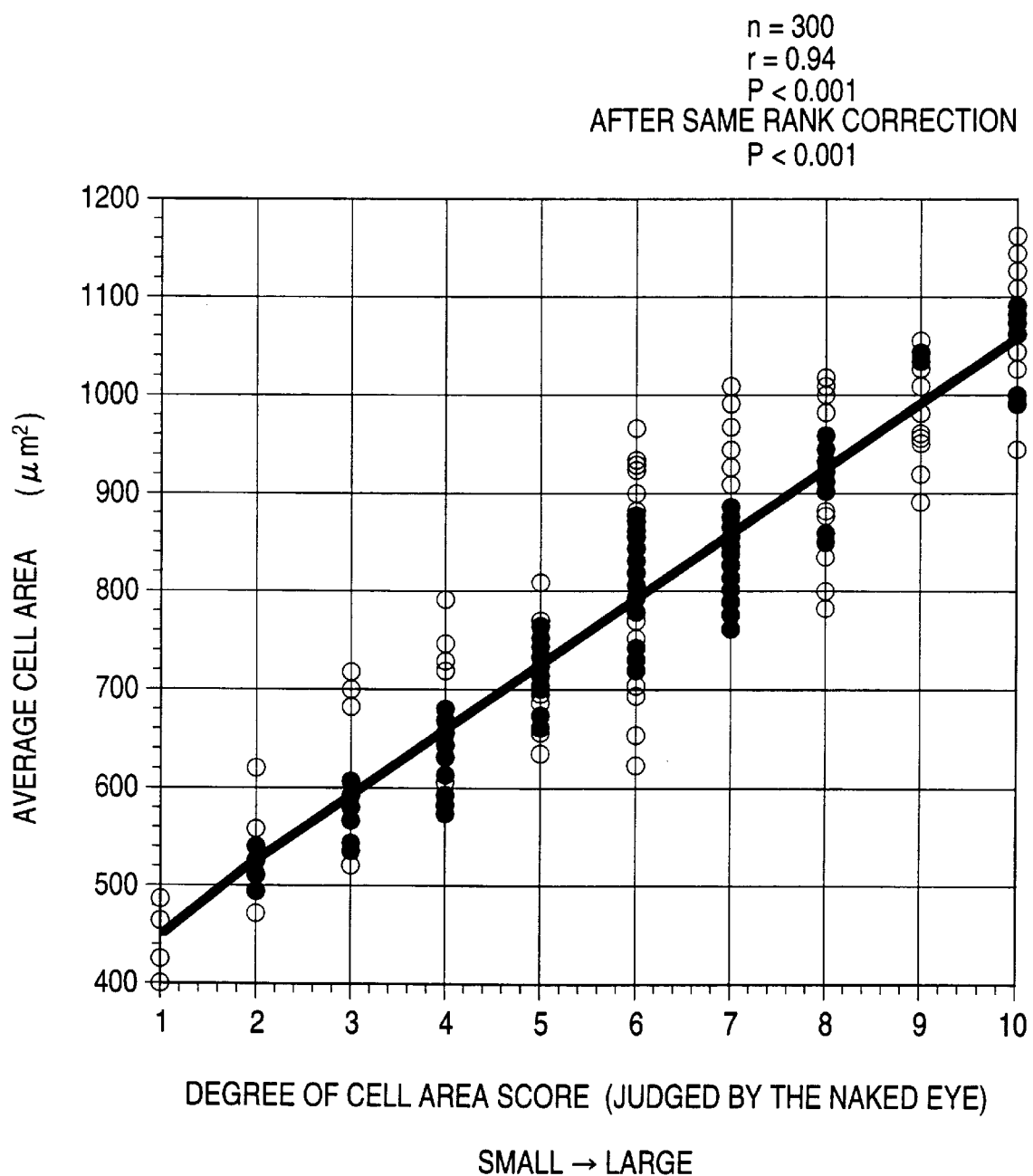
FIG. 4 is a diagram showing the correlation between the score of the degree of cell area judged by a skilled person and the actual average cell area.

Further, horny cells collected from cheek of 300 female subjects were scored in the same manner. Then the correlation between the degree of area scored by the skilled person and the actual average cell area was examined. The results are shown in FIG. 4.

Figure 5:
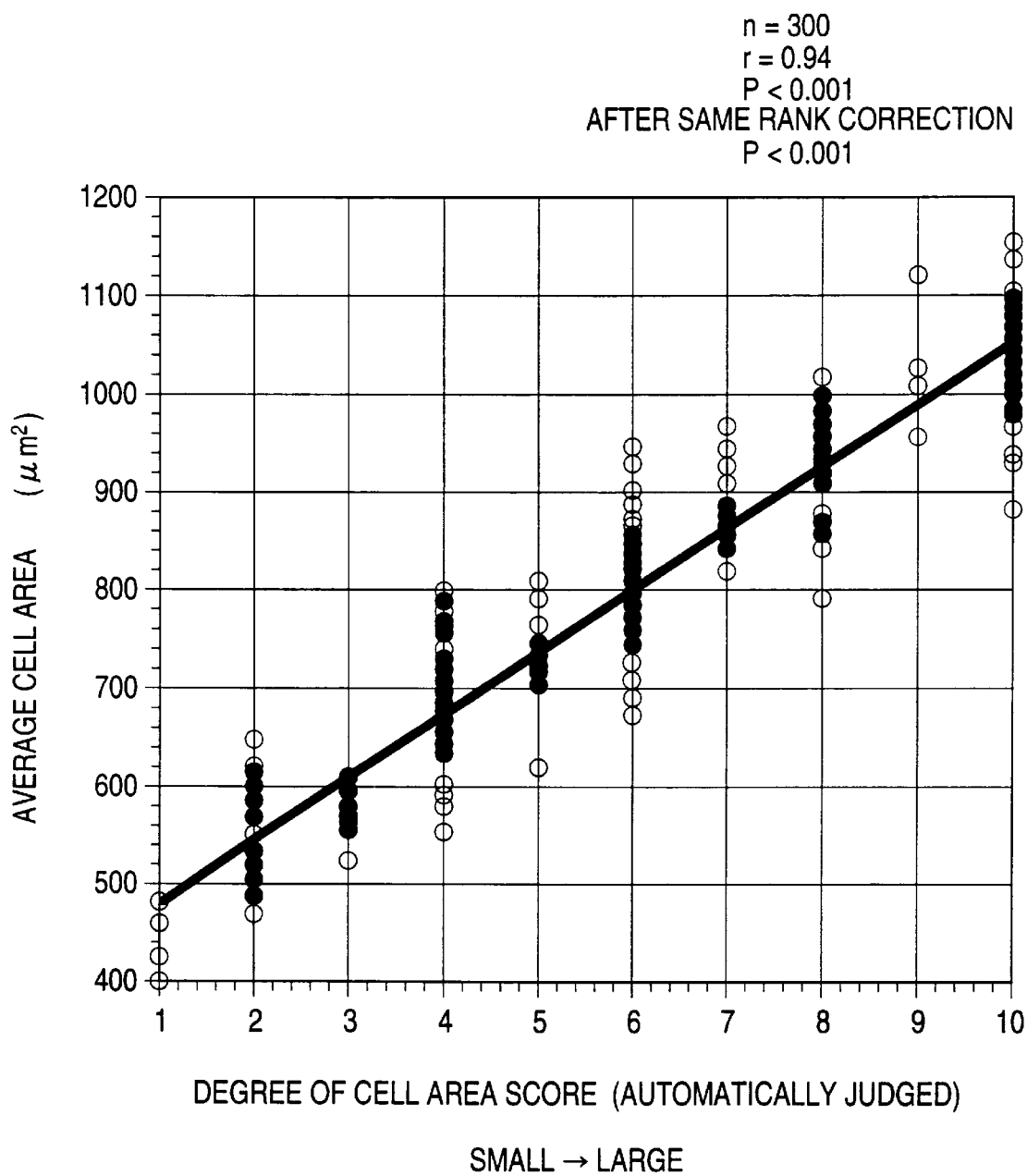
FIG. 5 is a diagram showing the correlation between the score of the degree of cell area judged automatically and the actual average cell area.

On the other hand, the degree of area scores were obtained by analyzing the images of the horny cells in the following manner. First, the images of the above-mentioned horny cells of 300 female subjects and the score of each image judged by the skilled person were inputted into a learning-type image measurement system [Aiss (Adaptive Intelligent Sensing System), Oyo Keisoku Kenkyusho] and the classification rule was established. In this case, 25 mask patterns (3×3 dots) were employed as the autocorrelation mask patterns. The horny cells collected from cheek of 300 female panelists were automatically judged and scored in accordance with the classification rule. Next, the correlation between the degree of area score thus judged automatically and the actual average cell area was examined. The results are shown in FIG. 5.

Figure 6:
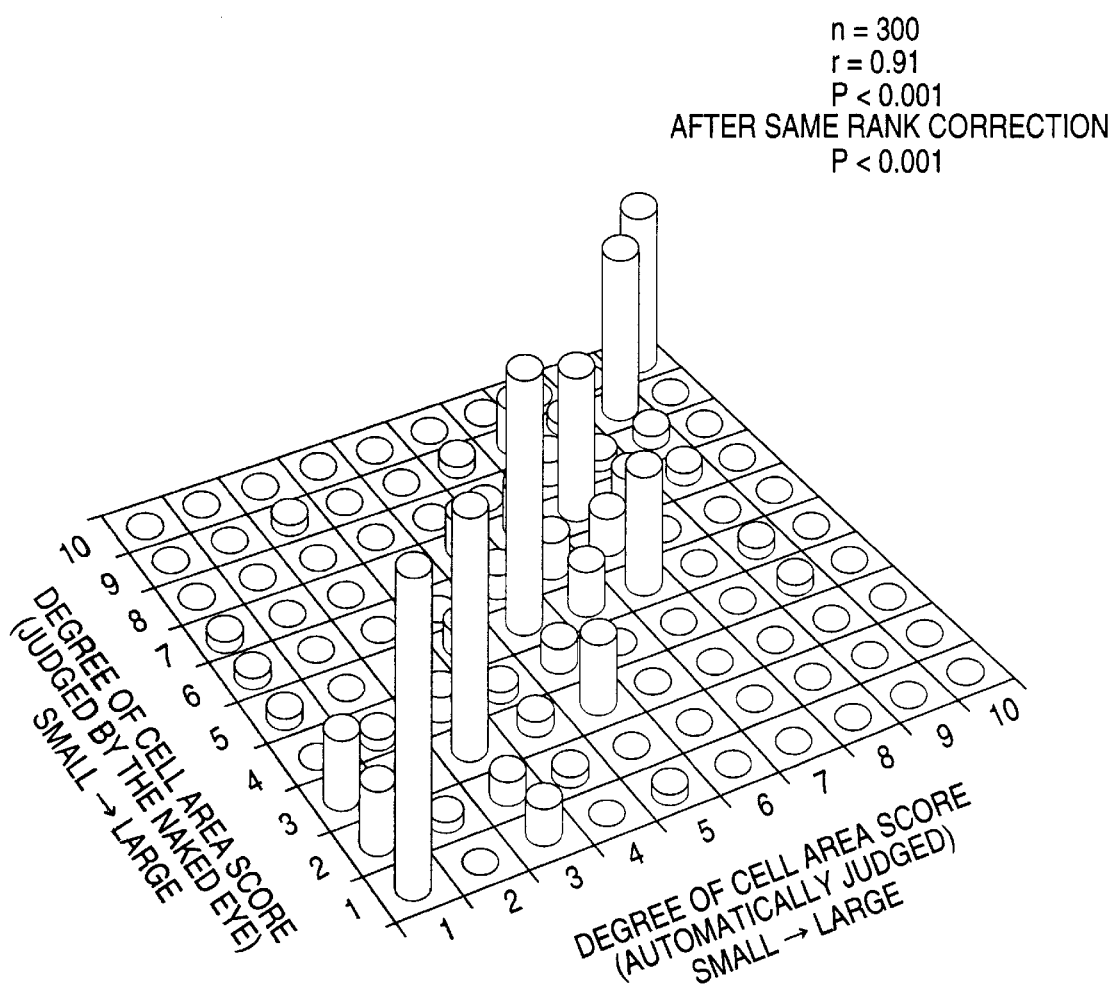
FIG. 6 is a diagram showing the correlation between the score of the degree of cell area judged automatically and the score of the degree of cell area judged by the skilled person.

Furthermore, the correlation between the degree of area score thus judged automatically and the degree of area score judged by the skilled person was examined. The results are shown in FIG. 6. As shown in FIG. 6, this system shows a high average learning ratio (i.e., the ratio of correct answers to the learning achievement accumulated by the automatic judgement system) of 92% in the automatic judgement of the degree of area.

By using the method of the present invention, the degree of overlapping, the degree of ellipticity or the degree of area of horny cells is judged and thus the skin surface conditions can be accurately analyzed. Since the judgement is performed via image analysis, the skin surface can be easily analyzed. Since the image analysis is performed with a learning-type image measurement system provided with autocorrelation mask patterns, the results of the analysis on the skin surface conditions can be obtained within an extremely short period of time (for example, it takes ten and several seconds for imaging the horny cells, analyzing the image, judging on the basis of the results of the analysis and outputting the analytical data on skin surface conditions). As a result, it becomes possible to deal with the data of a number of horny cells and increase the fundamental data for analysis. Thus, the analysis accuracy can be elevated.

What is claimed is:

1. A method for analyzing a skin surface, comprising:
    transferring horny cells from the skin surface of a subject onto an adhesive face of a base sheet;
    producing an image of the horny cells thus transferred;
    executing a learning-type image measurement system equipped with autocorrelation mask patterns on a morphology of the horny cells in the image, thus judging at least one of a degree of overlapping, a degree of ellipticity and a degree of area of the horny cells; and
    analyzing skin surface conditions using the judgment of said at least one of the degree of overlapping, the degree of ellipticity and the degree of the area of the horny cells,
    wherein, after transferring the horny cells onto the adhesive face of the base sheet, an integral cover sheet of said base sheet is adhered to the adhesive face and then the image of the horny cells is produced.

2. A method for analyzing the skin surface as claimed in claim 1, wherein the image of the horny cells is differentiated with an image differential filter to thereby highlight an outline of the horny cells and then the learning-type image measurement system equipped with autocorrelation mask patterns is executed.

3. A method for analyzing the skin surface as claimed in claim 1, wherein a degree of maturation of the horny cells is evaluated using the judgement of said at least one of the degree of overlapping, the degree of ellipticity and the degree of area of the horny cells.

4. A method for analyzing the skin surface as claimed in claim 1, further comprising:
    using transparent sheets as said base sheet and said integral cover sheet;
    irradiating the base sheet carrying the horny cells transferred thereonto with light in a predetermined dose;
    measuring a quantity of the transmitted light;
    determining an amount of the horny cells which have been peeled off and transferred onto the base sheet;
    judging a peeling strength of the horny cells therefrom; and
    analyzing the skin surface conditions using the peeling strength and a degree of maturation of the horny cells.

5. An apparatus for analyzing a skin surface, comprising:
    means for imaging a base sheet carrying horny cells transferred thereonto, thereby producing an image of said horny cells;
    means for analyzing the image by executing a learning-type image measurement system provided with autocorrelation mask patterns on a morphology of the imaged horny cells so as to judge at least one of a degree of overlapping, a degree of ellipticity and a degree of area of the horny cells; and means for analyzing skin surface conditions using said at least one of the degree of overlapping, the degree of ellipticity and the degree of area of the horny cells judged by the means for analyzing the image, wherein the base sheet comprises an integral cover sheet for covering said horny cells transferred thereonto.

6. An apparatus for analyzing the skin surface as claimed in claim 5, wherein the means for analyzing the image comprises differentiating the image of the horny cells with an image differential filter to thereby highlight an outline of the horny cells and executing a learning-type image measurement system equipped with autocorrelation mask patterns.

7. An apparatus for analyzing the skin surface as claimed in claim 5, wherein said means for analyzing the skin surface conditions comprises evaluating a degree of maturation of the horny cells using the judgment of said at least one of the degree of overlapping, the degree of ellipticity and the degree of area of the horny cells.

8. An apparatus for analyzing the skin surface as claimed in claim 7, further comprising:

means for irradiating the base sheet carrying the horny cells transferred thereonto with light in a predetermined dose and measuring a quantity of the transmitted light, wherein said means for analyzing the skin surface conditions comprises determining an amount of the horny cells, which have been peeled off and transferred onto the base sheet, using the quantity of measured transmitted light, judging a peeling strength of the horny cells therefrom, and analyzing the skin surface conditions using the peeling strength and a degree of maturation of the horny cells.

9. A method for analyzing a skin surface, comprising:

transferring horny cells from the skin surface of a subject onto an adhesive face of a base sheet;

producing an image of the horny cells thus transferred;

executing a learning-type image measurement system equipped with autocorrelation mask patterns on a morphology of the horny cells in the image, thus judging at least one of a degree of overlapping, a degree of ellipticity and a degree of area of the horny cells; and analyzing skin surface conditions using the judgment of said at least one of the degree of overlapping, the degree of ellipticity and the degree of area of the horny cells;

irradiating the base sheet carrying the horny cells transferred thereonto with light in a predetermined dose;

measuring a quantity of the light transmitted;

determining an amount of the horny cells which have been peeled off and transferred onto the base sheet;

judging a peeling strength of the horny cells therefrom; and analyzing the skin surface conditions using the peeling strength and a degree of maturation of the horny cells, wherein, after transferring the horny cells onto the adhesive face of the base sheet, a cover sheet of said base sheet is adhered to the adhesive face and then the image of horny cells is produced using transparent sheets as said base sheet and said integral cover sheet;.

10. An apparatus for analyzing a skin surface, comprising:

means for imaging a base sheet carrying horny cells transferred thereonto, thereby producing an image of said horny cells;

means for analyzing the image by executing a learning-type image measurement system provided with autocorrelation mask patterns on a morphology of the imaged horny cells so as to judge at least one of a degree of overlapping, a degree of ellipticity and a degree of area of the horny cells;

means for analyzing skin surface conditions using said at least one of the degree of overlapping, the degree of ellipticity and the degree of area of the horny cells judged by the means for analyzing the image; and means for irradiating the base sheet carrying the horny cells transferred thereonto with light in a predetermined dose and measuring a quantity of light transmitted, wherein said means for analyzing the skin surface conditions comprises evaluating a degree of maturation of the horny cells using the judgment of said at least one of the degree of overlapping, the degree of ellipticity and the degree of area of the horny cells; and said means for analyzing the skin surface conditions comprises determining an amount of the horny cells, which have been peeled off and transferred onto the base sheet, using the quantity of measured transmitted light, judging a peeling strength of the horny cells therefrom, and analyzing the skin surface conditions using the peeling strength and the degree of maturation of the horny cells.

* * * * *